United States Patent
Chen et al.

(10) Patent No.: US 10,536,709 B2
(45) Date of Patent: Jan. 14, 2020

(54) PRIORITIZED COMPRESSION FOR VIDEO

(71) Applicant: NVIDIA Corporation, Santa Clara, CA (US)

(72) Inventors: Sien Chen, Shenzhen (CN); Shuang Xu, Shenzhen (CN)

(73) Assignee: NVIDIA CORPORATION, Santa Clara, CA (US)

( * ) Notice: Subject to any disclaimer, the term of this patent is extended or adjusted under 35 U.S.C. 154(b) by 926 days.

(21) Appl. No.: 13/675,948

(22) Filed: Nov. 13, 2012

(65) Prior Publication Data

US 2013/0121563 A1 May 16, 2013

(30) Foreign Application Priority Data

Nov. 14, 2011 (CN) .......................... 2011 1 0357809

(51) Int. Cl.
G06K 9/00 (2006.01)
H04N 19/29 (2014.01)

(52) U.S. Cl.
CPC .................. H04N 19/29 (2014.11)

(58) Field of Classification Search
USPC ......... 382/154, 235, 243; 345/419, 640, 555
See application file for complete search history.

(56) References Cited

U.S. PATENT DOCUMENTS

| | | | |
|---|---|---|---|
| 4,864,629 A | 9/1989 | Deering | |
| 5,430,464 A | 7/1995 | Lumelsky | |
| 5,483,254 A | 1/1996 | Powell | |
| 5,500,939 A | 3/1996 | Kurihara | |
| 5,577,981 A | 11/1996 | Jarvik | |
| 5,841,447 A | 11/1998 | Drews | |
| 5,886,701 A | 3/1999 | Chauvin et al. | |
| 5,913,727 A | 6/1999 | Ahdoot | |
| 5,949,428 A | 9/1999 | Toelle et al. | |
| 6,016,474 A | 1/2000 | Kim et al. | |
| 6,057,855 A | 5/2000 | Barkans | |
| 6,064,354 A | 5/2000 | DeLuca | |
| 6,141,740 A | 10/2000 | Mahalingaiah et al. | |
| 6,243,054 B1 | 6/2001 | DeLuca | |
| 6,278,418 B1 | 8/2001 | Doi | |

(Continued)

FOREIGN PATENT DOCUMENTS

CN 101420618 A 4/2009
CN 101945287 A 1/2011

(Continued)

OTHER PUBLICATIONS

Parhami, Computer Arithmetic, Oxford University Press, Jun. 2000, pp. 413-418. city by other.

(Continued)

*Primary Examiner* — Nancy Bitar
(74) *Attorney, Agent, or Firm* — Zilka-Kotab, P.C.

(57) ABSTRACT

In one embodiment, a method of prioritized compression for 3D video wireless display, the method comprising: inputting video data; abstracting scene depth of the video data; estimating foreground and background for each image of the video data; performing different kinds of compressions to the foreground and background in each image; and outputting the processed video data. Thus, the image quality is not affected by the data loss during the wireless transmission.

17 Claims, 4 Drawing Sheets

(56) References Cited

U.S. PATENT DOCUMENTS

| | | | |
|---|---|---|---|
| 6,281,903 B1* | 8/2001 | Martin et al. | 345/421 |
| 6,308,565 B1 | 10/2001 | French et al. | |
| 6,314,493 B1 | 11/2001 | Luick | |
| 6,438,664 B1 | 8/2002 | McGrath et al. | |
| 6,476,807 B1 | 11/2002 | Duluk, Jr. et al. | |
| 6,492,991 B1 | 12/2002 | Morein et al. | |
| 6,496,193 B1 | 12/2002 | Surti et al. | |
| 6,525,725 B1* | 2/2003 | Deering | 345/419 |
| 6,545,683 B1 | 4/2003 | Williams | |
| 6,559,813 B1 | 5/2003 | DeLuca et al. | |
| 6,611,253 B1* | 8/2003 | Cohen | G06F 3/0418 345/168 |
| 6,690,381 B1 | 2/2004 | Hussain et al. | |
| 6,750,870 B2 | 6/2004 | Olarig | |
| 6,825,847 B1 | 11/2004 | Molnar et al. | |
| 6,839,062 B2 | 1/2005 | Aronson et al. | |
| 6,891,543 B2 | 5/2005 | Wyatt | |
| 6,951,515 B2 | 10/2005 | Ohshima et al. | |
| 7,015,909 B1 | 3/2006 | Morgan, III et al. | |
| 7,072,477 B1* | 7/2006 | Kincaid | 381/107 |
| 7,170,515 B1 | 1/2007 | Zhu | |
| 7,203,356 B2* | 4/2007 | Gokturk et al. | 382/154 |
| 7,218,291 B2 | 5/2007 | Abdalla et al. | |
| 7,308,115 B2* | 12/2007 | Zhang et al. | 382/107 |
| 7,324,594 B2* | 1/2008 | Lamboray et al. | 375/240.03 |
| 7,370,016 B1* | 5/2008 | Hunter et al. | 705/57 |
| 7,463,270 B2 | 12/2008 | Vale et al. | |
| 7,486,290 B1 | 2/2009 | Kilgariff et al. | |
| 7,616,202 B1 | 11/2009 | Chen et al. | |
| 7,692,659 B1 | 4/2010 | Molnar et al. | |
| 7,719,563 B2* | 5/2010 | Richards | 348/36 |
| 7,839,803 B1* | 11/2010 | Snelgrove et al. | 370/260 |
| 7,856,147 B2* | 12/2010 | Srinidhi | 382/235 |
| 7,925,067 B2* | 4/2011 | Bacus et al. | 382/128 |
| 8,019,449 B2* | 9/2011 | Barzegar et al. | 700/94 |
| 8,024,768 B2* | 9/2011 | Berger et al. | 725/146 |
| 8,279,168 B2 | 10/2012 | Glomski et al. | |
| 8,363,969 B1* | 1/2013 | Wang et al. | 382/251 |
| 8,375,301 B2* | 2/2013 | Nuyttens et al. | 715/717 |
| 8,411,966 B2* | 4/2013 | Zhang et al. | 382/201 |
| 8,610,707 B2 | 12/2013 | Chen | |
| 8,774,267 B2* | 7/2014 | Gaddy | G06T 1/0028 375/240.01 |
| 9,002,125 B2 | 4/2015 | Schneider et al. | |
| 9,883,120 B2* | 1/2018 | Adsumilli | H04N 5/272 |
| 2001/0038642 A1 | 11/2001 | Alvarez, II et al. | |
| 2001/0043751 A1 | 11/2001 | Takahashi et al. | |
| 2002/0024675 A1 | 2/2002 | Foxlin | |
| 2002/0109701 A1 | 8/2002 | Deering | |
| 2003/0001857 A1 | 1/2003 | Doyle | |
| 2003/0032484 A1* | 2/2003 | Ohshima | A63F 13/10 463/43 |
| 2003/0122820 A1 | 7/2003 | Doyle | |
| 2003/0160798 A1 | 8/2003 | Buehler | |
| 2003/0184468 A1 | 10/2003 | Chen et al. | |
| 2004/0021664 A1 | 2/2004 | Takemoto et al. | |
| 2004/0041822 A1 | 3/2004 | Iizuka et al. | |
| 2004/0102247 A1 | 5/2004 | Smoot et al. | |
| 2004/0130552 A1 | 7/2004 | Duluk, Jr. et al. | |
| 2004/0205281 A1 | 10/2004 | Lin et al. | |
| 2005/0009583 A1 | 1/2005 | Cheung et al. | |
| 2005/0062738 A1 | 3/2005 | Handley et al. | |
| 2005/0093873 A1 | 5/2005 | Paltashev et al. | |
| 2005/0140682 A1 | 6/2005 | Sumanaweera et al. | |
| 2006/0170703 A1 | 8/2006 | Liao | |
| 2006/0284792 A1 | 12/2006 | Foxlin | |
| 2007/0018973 A1 | 1/2007 | Shih et al. | |
| 2007/0188444 A1 | 8/2007 | Vale et al. | |
| 2007/0239409 A1 | 10/2007 | Alan | |
| 2007/0257906 A1 | 11/2007 | Shimura et al. | |
| 2008/0049964 A1 | 2/2008 | Porwal et al. | |
| 2008/0143895 A1 | 6/2008 | Peterka et al. | |
| 2008/0252596 A1 | 10/2008 | Bell et al. | |
| 2008/0273755 A1 | 11/2008 | Hildreth | |
| 2008/0293464 A1 | 11/2008 | Cheng et al. | |
| 2008/0293488 A1 | 11/2008 | Cheng et al. | |
| 2008/0312010 A1 | 12/2008 | Marty et al. | |
| 2009/0077504 A1 | 3/2009 | Bell et al. | |
| 2009/0099824 A1 | 4/2009 | Falash et al. | |
| 2010/0073363 A1 | 3/2010 | Densham et al. | |
| 2010/0074489 A1 | 3/2010 | Bacus et al. | |
| 2010/0149372 A1 | 6/2010 | Silverstein | |
| 2010/0177931 A1 | 7/2010 | Whytock et al. | |
| 2010/0194863 A1 | 8/2010 | Lopes et al. | |
| 2010/0296747 A1 | 11/2010 | Srinidhi | |
| 2011/0122224 A1* | 5/2011 | Lou | H04N 19/597 348/42 |
| 2011/0159885 A1 | 6/2011 | Song et al. | |
| 2011/0165841 A1 | 7/2011 | Baek et al. | |
| 2011/0181622 A1 | 7/2011 | Bacus et al. | |
| 2011/0205389 A1 | 8/2011 | Zhang et al. | |
| 2011/0249076 A1 | 10/2011 | Zhou et al. | |
| 2012/0008672 A1* | 1/2012 | Gaddy | G06T 1/0028 375/240.01 |
| 2012/0014456 A1 | 1/2012 | Martinez Bauza et al. | |
| 2012/0139906 A1 | 6/2012 | Zhang et al. | |
| 2012/0162379 A1 | 6/2012 | Dahi et al. | |
| 2012/0183215 A1 | 7/2012 | Van Hook et al. | |
| 2012/0257065 A1 | 10/2012 | Velarde et al. | |
| 2012/0262592 A1 | 10/2012 | Rabii | |
| 2012/0320232 A1 | 12/2012 | Trumbo | |
| 2013/0009943 A1 | 1/2013 | Li et al. | |
| 2013/0021352 A1 | 1/2013 | Wyatt et al. | |
| 2013/0027521 A1 | 1/2013 | DeLuca | |
| 2013/0027606 A1 | 1/2013 | Voss et al. | |
| 2013/0202191 A1 | 8/2013 | Wang | |
| 2014/0035939 A1 | 2/2014 | Schneider | |
| 2014/0105513 A1 | 4/2014 | Schneider et al. | |
| 2014/0269935 A1* | 9/2014 | Gaddy | G06T 1/0028 375/240.25 |
| 2015/0213640 A1 | 7/2015 | Neill et al. | |

FOREIGN PATENT DOCUMENTS

| | | |
|---|---|---|
| CN | 102006473 A | 4/2011 |
| CN | 102055982 A | 5/2011 |

OTHER PUBLICATIONS gDebugger, graphicRemedy, http://www.gremedy.com, Aug. 8, 2006.

Duca, et al., A Relational Debugging Engine for Graphics Pipeline, International Conference on Computer Graphics and Ineractive Techniques, ACM SIGGRAPH 2005, pp. 453-463, ISSN: 0730-0301.

Patent Application As Filed for U.S. Appl. No. 14/604,563; Inventors: Patrick Neill et al.; filed Jan. 23, 2015; "Hybrid Virtual 3D Rendering Approach to Stereovision,".

* cited by examiner

PRIORITIZED COMPRESSION FOR VIDEO

CROSS-REFERENCE TO RELATED APPLICATION

This patent application claims the benefit and priority of the co-pending Chinese Patent Application No. 201110357809.6, filed on Nov. 14, 2011, by Sien CHEN et al., which is hereby incorporated by reference in its entirety.

BACKGROUND

As we all know, the principle that we can have a three-dimensional (3D) experience is that the 3D film displays both left-eye image and corresponding right-eye image. In the prior art, taking a 1080p high definition display that progressive scans at the scanning rate of 120 hertz (Hz) with a bit depth of 24 bits for example, the data transmitting rate of the 3D video is up to 1920×1080×120×24 bps (bits per second)=5.6 Gigabits per second (Gbps), i.e. there are 5.6 Gb of data to be transmitted. Thus, when transmitting 3D video data from source, such as a laptop, a handheld and so on, to sink, such as a TV, a large monitor and so on with wireless technology, the 3D data should be compressed before transmission due to the bandwidth limitation of wireless transmission. However, during the compression, the data loss of the 3D video is quite a lot leading to distorted images, which greatly affect the quality of the images.

SUMMARY

Accordingly, there is a need in the art for a method and system of prioritized compression for three-dimensional (3D) video wireless display so that there is almost no distortion in the 3D video images.

In order to solve the problem mentioned above, various embodiments of the present invention provide a method and system of prioritized compression for 3D video wireless display.

In one embodiment of the invention, a method of prioritized compression for 3D video wireless display is provided. The method comprising: inputting video data; abstracting scene depth of the video data; foreground and background estimation for each image of the video data, performing different kinds of compressions to the foreground and background in each image, and outputting the processed video data.

Preferably, in an embodiment, the way of the inputting video data or the outputting the processed video data is DMA (direct memory access) and FIFO (first in first out).

Preferably, in an embodiment, the abstracting scene depth of the video data comprises: differentiating the type of the video; and copying the scene depth from a Z-Buffer, if the type of the 3D video is gaming video.

Preferably, in an embodiment, the abstracting scene depth of the video data comprises: differentiating the type of the video; and estimating the motion between the left image and the right image, if the type of the 3D video is stereo stream, namely a movie.

Preferably, in an embodiment, the way for foreground and background estimation for each image is to search the depth threshold in the quantity-depth histogram of each frame so as to estimate the foreground and background.

Preferably, in an embodiment, the performing different kinds of compressions to the foreground and background in each image comprises: performing high profile stereo coding to the foreground; and performing base profile mono coding to the background.

Preferably, in an embodiment, the performing different kinds of compressions of the foreground and background in each image comprises: the compression ratio of the foreground is less than that of the background.

Preferably, in an embodiment, the performing different kinds of compressions to the foreground and background in each image comprises: the compression ratio of the foreground is zero (0) and the compression ratio of the background is 85%.

Preferably, in an embodiment, the performing different kinds of compressions to the foreground and background in each image comprises: the compression rate of the foreground is less than the compression rate of the background.

Preferably, in an embodiment, the performing different kinds of compressions to the foreground and background in each image comprises: the compression rate of the foreground is 80 Mbps (megabits per second) and the compression rate of the background is 20 Mbps.

In another aspect in accordance with an embodiment of the invention, a system of prioritized compression for 3D video wireless display is provided. The system comprises: a data acquiring unit for acquiring accounting data; an exception management unit for performing exception check on the acquired accounting data according to predetermined exception check rules while or after the data is acquired; and a database unit for storing data and detected exceptions.

Preferably, in an embodiment, the way of inputting video data or outputting the processed video data is DMA (direct memory access) and FIFO (first in first out).

Preferably, in an embodiment, the abstracting scene depth of the video data comprises differentiating the type of the video; and copying the scene depth from a Z-Buffer, if the type of the 3D video is gaming video.

Preferably, in an embodiment, the abstracting scene depth of the video data comprises differentiating the type of the video; and estimating the motion between the left image and the right image, if the type of the 3D video is stereo stream, namely a movie.

Preferably, in an embodiment, the way for foreground and background estimation for each image is to search the depth threshold in the quantity-depth histogram of each frame so as to estimate the foreground and background.

Preferably, in an embodiment, the performing different kinds of compressions to the foreground and background in each image comprises performing high profile stereo coding to the foreground and performing base profile mono coding to the background.

Preferably, in an embodiment, the performing different kinds of compressions of the foreground and background in each image comprises: the compression ratio of the foreground is less than that of the background.

Preferably, in an embodiment, the performing different kinds of compressions to the foreground and background in each image comprises: the compression ratio of the foreground is zero (0) and the compression ratio of the background is 85%.

Preferably, in an embodiment, the performing different kinds of compressions to the foreground and background in each image comprises: the compression rate of the foreground is less than the compression rate of the background.

Further, an embodiment in accordance with the present invention provides a computer program product, resident on a computer readable medium, operable for executing instructions for prioritized compression for 3D video wireless display. The computer program product comprising instruction code to input video data, abstract scene depth of the video data, estimate foreground and background for each image of the video data, perform different kinds of compressions to the foreground and background in each image, and output the processed video data.

Thus, the method and system of prioritized compression for 3D video wireless display provided by various embodiments in accordance with the present invention uses a prioritized compression strategy so that the image quality is not affected by the data loss and provides the best 3D experience to users with limited bandwidth during the wireless transmission.

Additional features and advantages of various embodiments in accordance with the invention will be set forth in the description that follows, and in part will be apparent from the description, or may be learned by practice of various embodiments in accordance with the invention. The advantages of various embodiments in accordance with the invention will be realized and attained by the structure particularly pointed out in the written description and claims hereof as well as the appended drawings.

It is to be understood that both the foregoing general description and the following detailed description are exemplary and explanatory and are intended to provide further explanation of various embodiments in accordance with the invention as claimed.

While particular embodiments in accordance with the invention have been specifically described within this Summary, it is noted that the invention and the claimed subject matter are not limited in any way by these embodiments.

BRIEF DESCRIPTION OF THE DRAWINGS

The accompanying drawings are included to provide a further understanding of various embodiments in accordance with the invention, and are incorporated in and constitute a part of this specification. The drawings illustrate various embodiments of the invention and, together with the description, serve to explain the principles of various embodiments in accordance with the invention. In the drawings.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details or with equivalents thereof. In other instances, well known methods, procedures, components, and circuits have not been described in detail as not to unnecessarily obscure aspects of the invention.

Various embodiments in accordance with the invention relate generally to a method and system for three-dimensional (3D) video compression, and, in particular, to a method and system of prioritized compression for 3D video wireless display.

Example embodiments are described herein in the context of method and system of prioritized compression for 3D video wireless display. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Reference will now be made in detail to the preferred embodiments of the present invention, examples of which are illustrated in the accompanying drawings.

Figure 1:
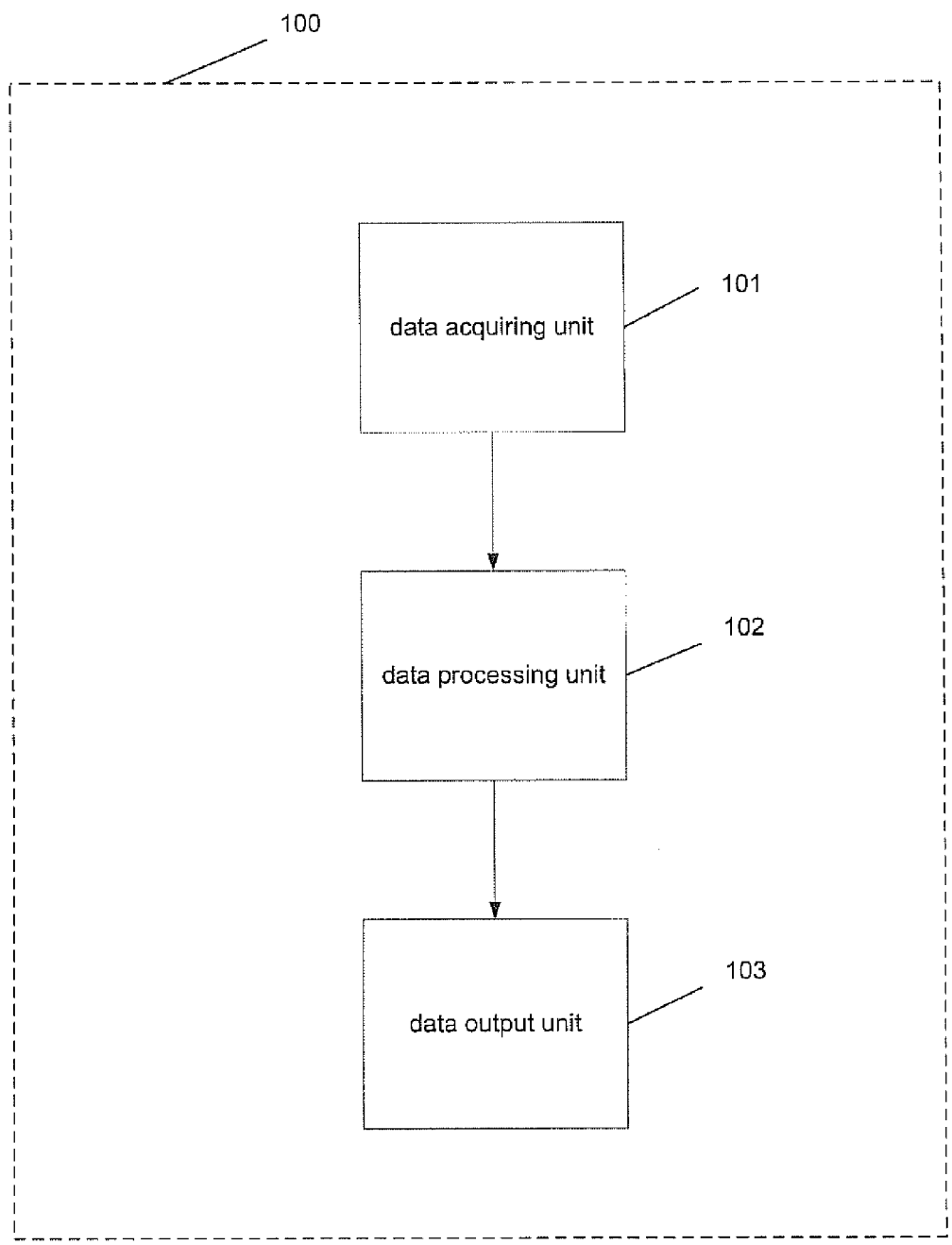
FIG. 1 illustrates a structure of a system of prioritized compression for 3D video wireless display provided by the present invention in accordance with one embodiment.

FIG. 1 illustrates a structure of a system 100 of prioritized compression for 3D video wireless display provided by the present invention in accordance with one embodiment. The system 100 comprises a data inputting unit 101 for inputting video data, a data processing unit 102 for abstracting scene depth of the video data, foreground and background estimation for each image of the video data, performing different kinds of compressions to the foreground and background in each image, and outputting the processed video data, and a data outputting unit 103 for storing data and detected exceptions.

Figure 2:
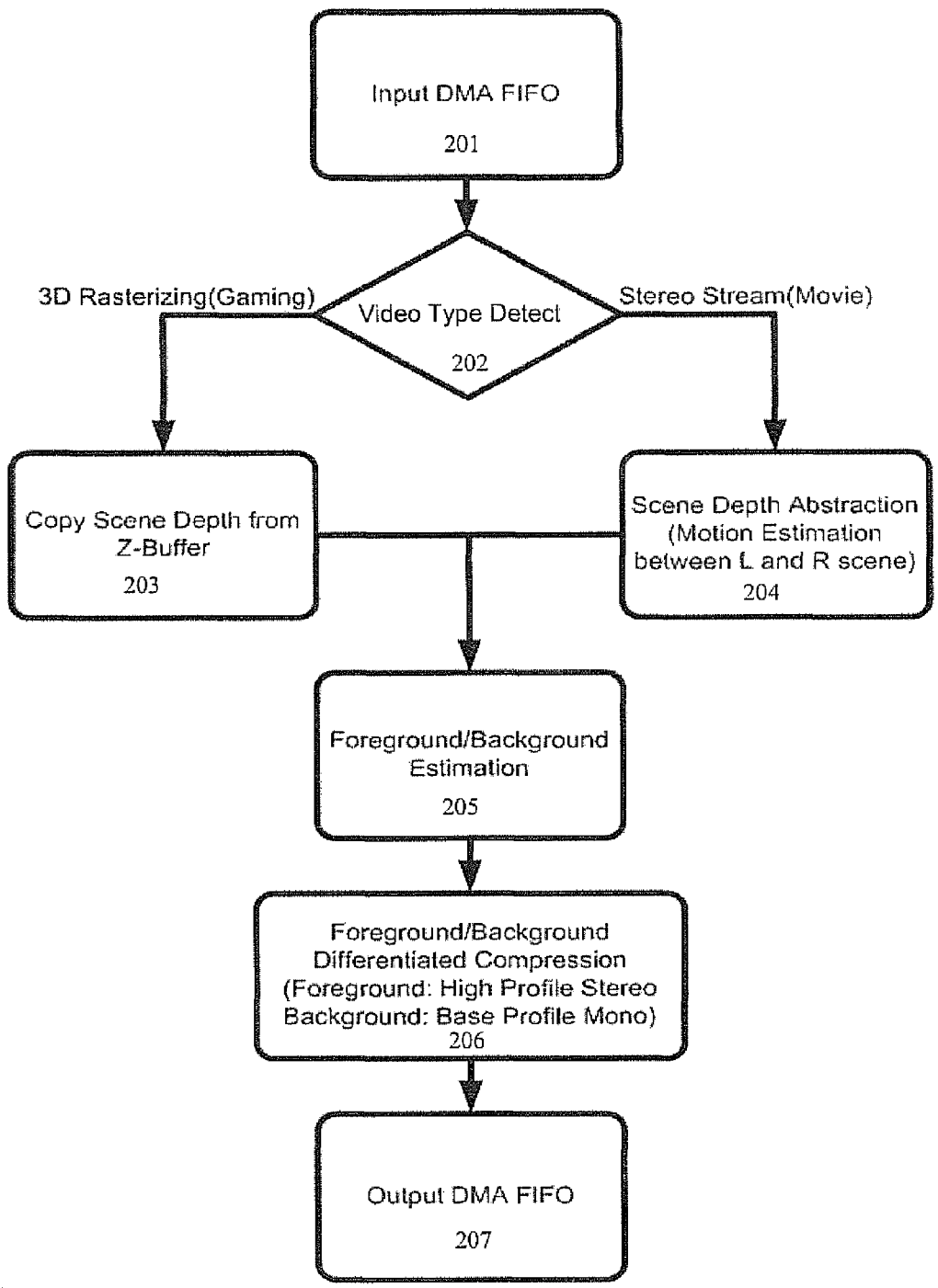
FIG. 2 illustrates workflow of a method of prioritized compression for 3D video wireless display provided by the present invention in accordance with one embodiment.

FIG. 2 illustrates workflow of a method of prioritized compression for 3D video wireless display provided by the present invention in accordance with one embodiment.

At step 201, the data inputting unit 101 inputs 3D data. For example, the way of inputting video data is DMA (direct memory access) and FIFO (first in first out).

At step 202, the data processing unit 102 differentiates the data type of the 3D video. If it is a rasterized image, e.g., a gaming video, then at step 203, copy the scene depth data from a Z-buffer.

Figure 3:
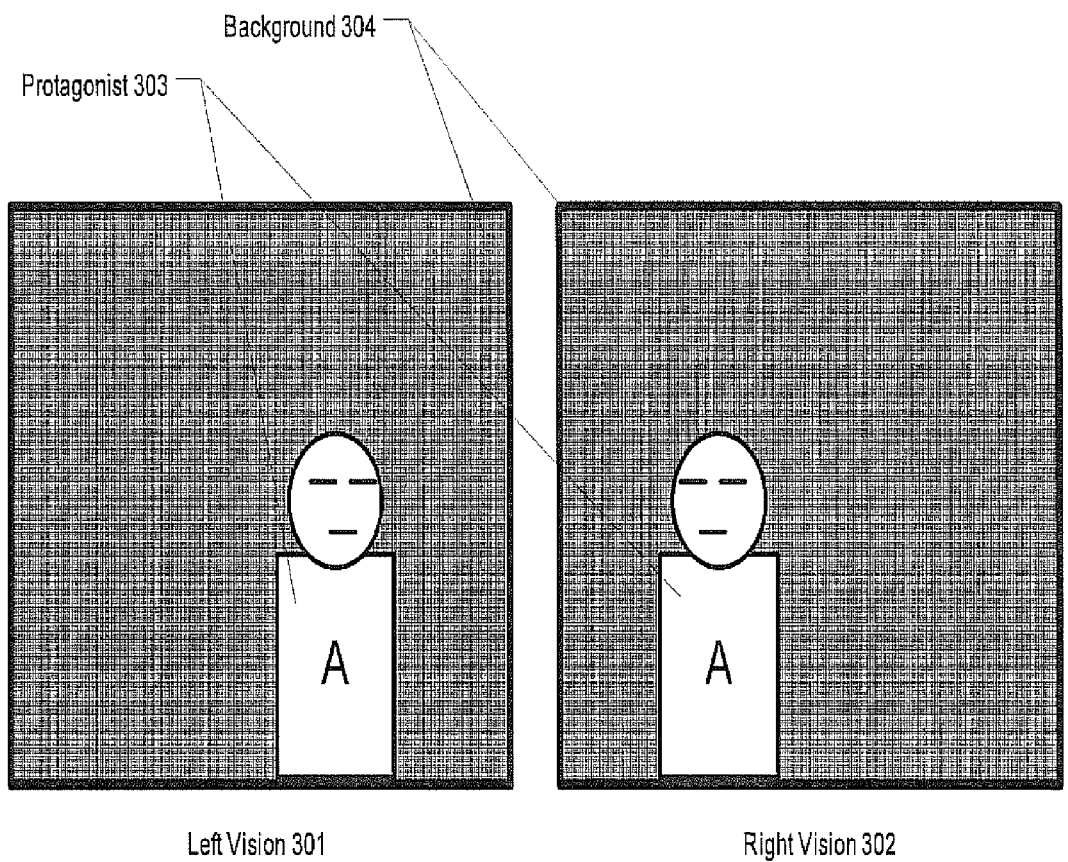
FIG. 3 illustrates a schematic diagram of the foreground and background in the left image and the right image respectively during the 3D video display in accordance with one embodiment.

On the other hand, if the data type of the 3D video is a stereo stream, e.g., a 3D movie, then at step 204, motion estimation is performed by comparing the displacement vectors of left image and the right image. The bigger the displacement vector is, the shallower the scene depth is. If the displacement vector is zero (0), the scene depth is indefinite. The scene depth data are relative values and the scene depth data can be abstracted accordingly. For example, FIG. 3 illustrates a schematic diagram of the foreground and background in a left image 301 and a right image 302 respectively during the 3D video display in accordance with one embodiment. As shown in FIG. 3, a left image 301 and a right image 302 should be shown simultaneously. The left image 301 and the right image 302 are both made up of image block 303 and image block 304. The displacement vectors are estimated by comparing image block 303 and image block 304 in the left image 301 and the right image 302. It is apparent that the displacement vector in image block 303 is larger and the image block 304 is almost zero (0). Therefore, the scene depth of image block 303 is shallow and scene depth of image block 304 tends to be infinite.

Figure 4:
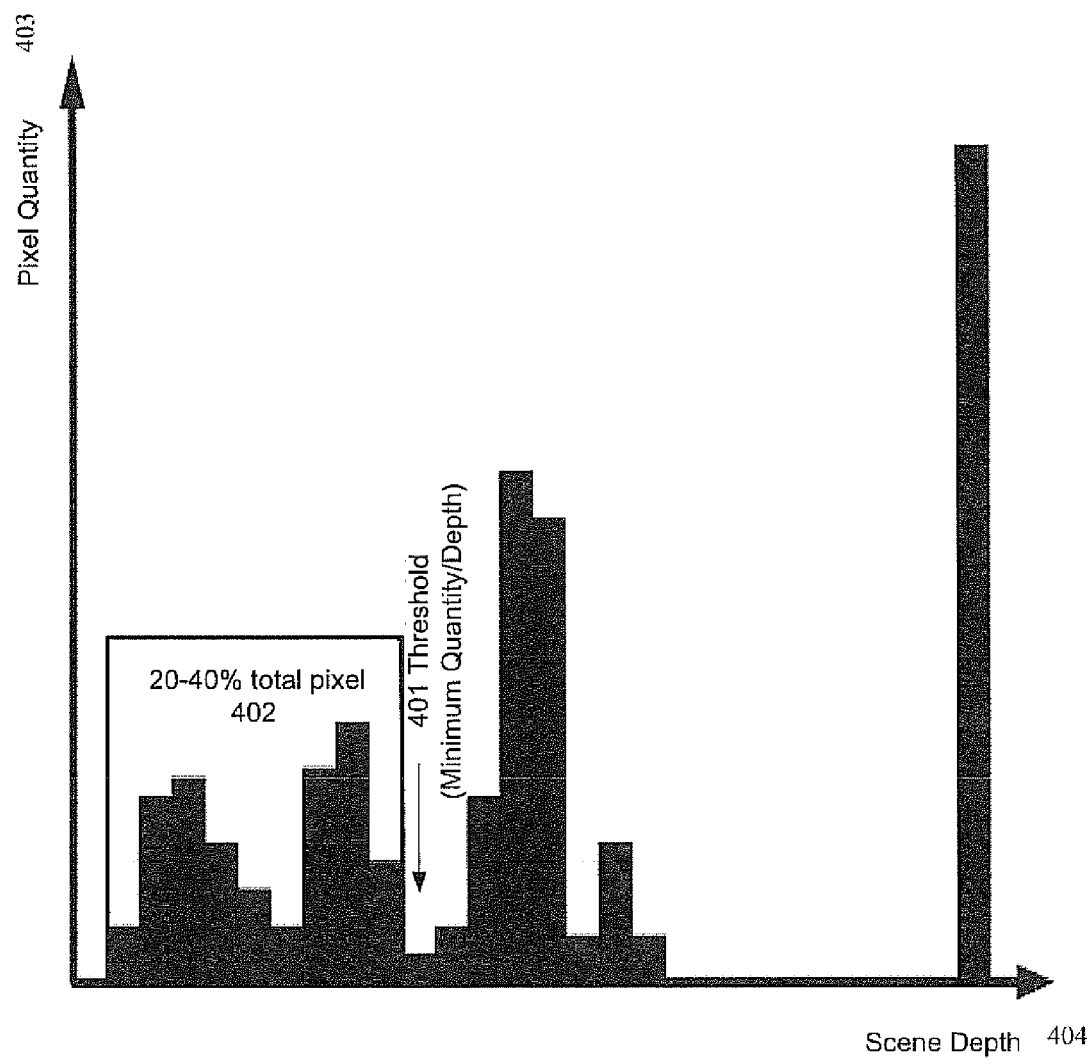
FIG. 4 is a quantity-depth histogram of a frame in accordance with one embodiment.

After the scene depth data is abstracted, at step 205, according to the scene depth data, data processing unit 102 estimates the foreground and the background. The foreground is the part that the audience will focus on and it floats from the background. In accordance with one embodiment, the depth threshold of each frame can be searched out in the quantity-depth histogram. Generally speaking, the amount of the foreground pixels is about 20-40% of the total amount. For example, FIG. 4 is a quantity-depth histogram of a frame in accordance with one embodiment. As shown in FIG. 4, the depth threshold 401 is the scene depth 404 that has the least amount of pixels (pixel quantity 403). The amount of the pixels whose scene depth is lower than the depth threshold 401 is about 20-40% of the total amount and those pixels 402 constitutes the foreground and the rest of the pixels are background pixels.

At step 206, data processing unit 102 performs different compressions with different ratios to the foreground and background in each image. For example, in an embodiment, high profile stereo coding is performed to the foreground and the base profile mono coding is performed to the background. The compression ratio can be 0%, namely, no compression. Compared with the non-prioritized compression, the data loss of the foreground is less and reserves most or all the image details. The compression ratio of the background is 85%, e.g., it is 15% of the original size after compression. The foreground can be compressed with high data compression rate and the background can be compressed with low data rate. For example, in an embodiment, the compression rate of the high profile stereo coding for the foreground can be 80 Mbps (megabits per second) for maximum details, and the base profile mono coding for the background can be 20 Mbps. The background of the two images can be the same or almost the same, so the background data can be provided by only one of the image blocks and the other can restore from it, namely, the background can be shared by the left image 301 and the right image 302 for maximum bandwidth saving.

Finally, the data outputting unit 103 outputs the processed data at step 207. For example, in an embodiment, the way of inputting video data or outputting the processed video data is DMA (direct memory access) and FIFO (first in first out).

Moreover, an embodiment in accordance with the present invention also provides a computer program product, resident on a computer readable medium, operable for executing instructions for prioritized compression for 3D video wireless display. The computer program product comprises instruction code to input video data, abstract scene depth of the video data, estimate foreground and background for each image of the video data, perform different kinds of compressions to the foreground and background in each image, and output the processed video data.

Therefore, the method and system of prioritized compression for 3D video wireless display provided by various embodiments in accordance with the present invention, uses a prioritized compression strategy, so that the image quality is not affected by the data loss and provides the best 3D experience to users with limited bandwidth during the wireless transmission.

It should be appreciated that various modifications, adaptations and alternative embodiments thereof may be made within the scope and spirit of various embodiments in accordance with the invention. The invention is further defined by the following claims.

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the Claims and their equivalents.

What is claimed is:

1. A method comprising:
inputting three-dimensional (3D) video data;
abstracting scene depth of the 3D video data by
differentiating the type of the 3D video data; and
if the type of the 3D video data is stereo stream, estimating motion between a left image and a right image;
estimating foreground and background for each image of the 3D video data;
performing different kinds of compressions by performing high profile stereo coding to the foreground video data in each image; and performing base profile mono coding to the background video data in each image; and
outputting the compressed video data.

2. The method of claim 1, wherein the inputting 3D video data comprises DMA (direct memory access) and FIFO (first in first out).

3. The method of claim 1, wherein the abstracting scene depth of the 3D video data further comprises:
if the type of the 3D video data is gaming video, copying scene depth from a Z-Buffer.

4. The method of claim 1, wherein the estimating foreground and background comprises searching a depth threshold in a quantity-depth histogram of each image.

5. The method of claim 1, wherein the performing different kinds of compressions of the foreground and background in each image comprises processing different compressions with different ratios to the foreground and background in each image wherein the compression ratio of the foreground is less than the compression ratio of the background.

6. The method of claim 5, wherein the compression ratio of the foreground is zero and the compression ratio of the background is 85%.

7. The method of claim 5, wherein the performing different kinds of compressions to the foreground and background in each image comprises a compression rate of the foreground is less than a compression rate of the background.

8. The method of claim 7, wherein the performing different kinds of compressions to the foreground and background in each image comprises the compression rate of the foreground is 80 Mbps (megabits per second) and the compression rate of the background is 20 Mbps.

9. A system comprising:
a data inputting unit for inputting three-dimensional (3D) video data;
a data processing unit for abstracting scene depth of the 3D video data, estimating foreground and background for each image of the 3D video data, and performing different kinds of compressions to the foreground and background in each image by performing high profile stereo coding to the foreground video data in each image; and performing base profile mono coding to the background video data in each image; and a data outputting unit for outputting the compressed video data, wherein the data processing unit is coupled to the data inputting unit and the data outputting unit;

the abstracting scene depth of the 3D video data comprises:
differentiating the type of the 3D video data; and
if the type of the 3D video data is stereo stream, estimating the motion between a left image and a right image.

10. The system of claim 9, wherein the abstracting scene depth of the 3D video data further comprises:
if the type of the 3D video is gaming video, copying the scene depth from a Z-Buffer.

11. The system of claim 9, wherein the estimating foreground and background comprises searching a depth threshold in a quantity-depth histogram of each image.

12. The system of claim 9 wherein the performing different kinds of compressions of the foreground and background in each image comprises processing different compressions with different ratios to the foreground and background in each image wherein the compression ratio of the foreground is less than the compression ratio of the background.

13. A computer program resident on a non-transitory computer readable medium, operable for executing instructions to perform a method comprising:
inputting three-dimensional (3D) video data;
abstracting scene depth of the 3D video data comprising:
differentiating the type of the 3D video data; and
if the type of the 3D video data is stereo stream, estimating motion between a left image and a right image;
estimating foreground and background for each image of the 3D video data;
performing different kinds of compressions to the foreground and background in each image by performing high profile stereo coding to the foreground video data in each image; and performing base profile mono coding to the background video data in each image; and
outputting the compressed video data.

14. The computer program of claim 13, wherein the estimating foreground and background comprises searching a depth threshold in a quantity-depth histogram of each image.

15. The computer program of claim 13, wherein the abstracting scene depth of the 3D video data further comprises:
if the type of the 3D video data is gaming video, copying scene depth from a Z-Buffer.

16. The computer program of claim 13, wherein the performing different kinds of compressions of the foreground and background in each image comprises processing different compressions with different ratios to the foreground and background in each image wherein the compression ratio of the foreground is less than the compression ratio of the background.

17. The system of claim 9, wherein the performing different kinds of compressions to the foreground and background in each image comprises a compression rate of the foreground is less than a compression rate of the background.

* * * * *